United States Patent
Vauk et al.

(10) Patent No.: US 8,591,769 B2
(45) Date of Patent: Nov. 26, 2013

(54) HYDROGEN PRODUCTION WITH REDUCED CARBON DIOXIDE GENERATION AND COMPLETE CAPTURE

(75) Inventors: Dennis Vauk, Houston, TX (US); Bhadra S. Grover, Sugar Land, TX (US)

(73) Assignees: Air Liquide Large Industries U.S. LP, Houston, TX (US); L'Air Liquide Société Anonyme pour l'Étude et l'Exploitation de Procédés Georges Claude, Paris (FR)

(*) Notice: Subject to any disclaimer, the term of this patent is extended or adjusted under 35 U.S.C. 154(b) by 29 days.

(21) Appl. No.: 13/326,983

(22) Filed: Dec. 15, 2011

(65) Prior Publication Data

US 2013/0156685 A1 Jun. 20, 2013

(51) Int. Cl.
 *C01B 3/38* (2006.01)
 *C01B 3/26* (2006.01)

(52) U.S. Cl.
 USPC .......................................... 252/373; 423/652

(58) Field of Classification Search
 USPC ....................................................... 252/373
 See application file for complete search history.

(56) References Cited

U.S. PATENT DOCUMENTS

| | | |
|---|---|---|
| 2008/0244975 A1 | 10/2008 | Johnston |
| 2009/0230359 A1* | 9/2009 | Guvelioglu et al. .......... 252/373 |
| 2010/0037521 A1 | 2/2010 | Vakil et al. |

FOREIGN PATENT DOCUMENTS

| | | |
|---|---|---|
| EP | 1403217 A1 | 3/2004 |
| EP | 2141119 A1 | 1/2010 |
| WO | 2007068682 A1 | 6/2007 |

OTHER PUBLICATIONS

U.S. Appl. No. 12/970,041, filed Dec. 16, 2010.
PCT/US2012/069351; International Search Report & Written Opinion; May 4, 2013.

* cited by examiner

*Primary Examiner* — Melvin C Mayes
*Assistant Examiner* — Kenneth Vaden
(74) *Attorney, Agent, or Firm* — Justin K. Murray; Elwood L. Haynes

(57) ABSTRACT

The present invention is a method of reducing the carbon dioxide balance from a reformer furnace flue gas to the high pressure syngas exit water gas shift reaction unit. Introducing a heated gas mixture into at least one pre-reforming chamber. The heating being provided by indirect heat exchange with one or more of an SMR furnace flue gas or an SMR furnace syngas introducing the gas mixture into a standard H2 PSA unit, wherein the gas mixture is separated into a hydrogen enriched stream and a PSA tail gas stream; introducing the PSA tail gas stream into a CPU system, wherein the PSA tail gas stream is separated into a carbon dioxide enriched stream, a hydrogen rich stream, and a residual stream, and introducing the residual stream as fuel into the reformer furnace along with natural gas.

47 Claims, 4 Drawing Sheets

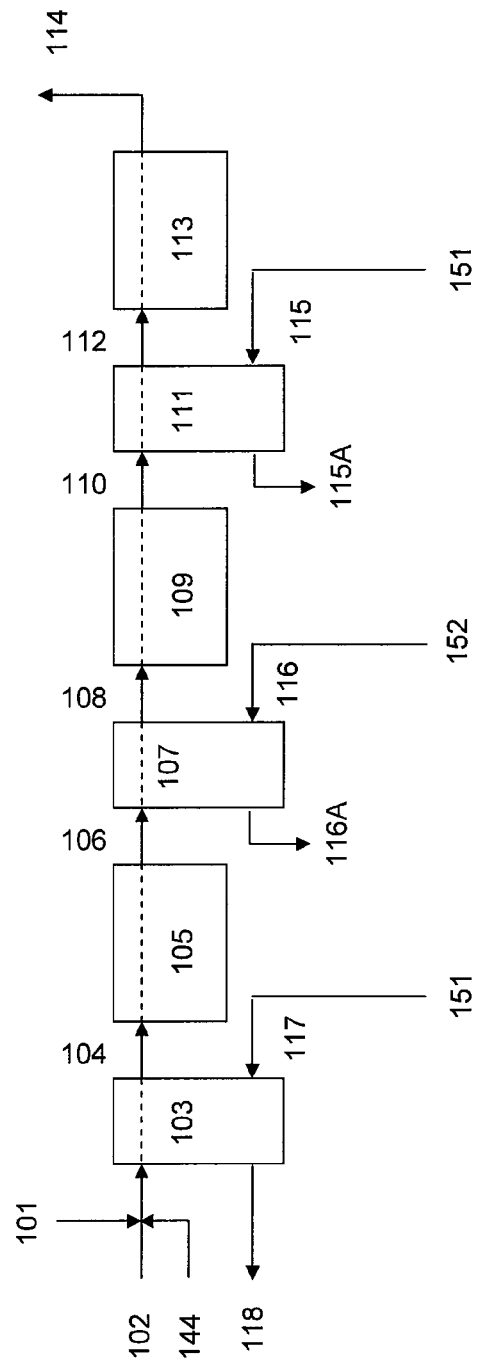
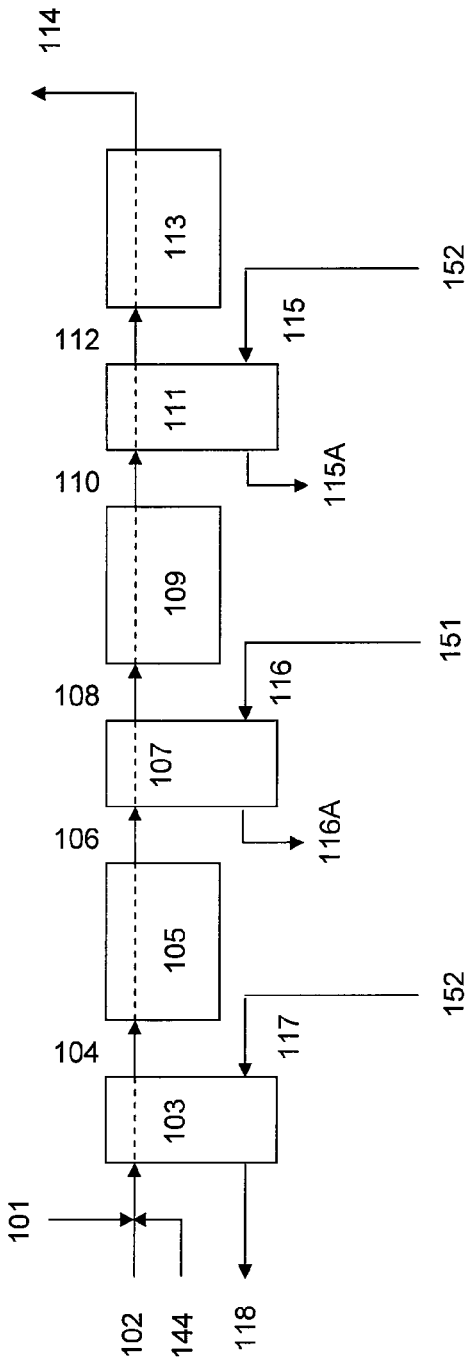

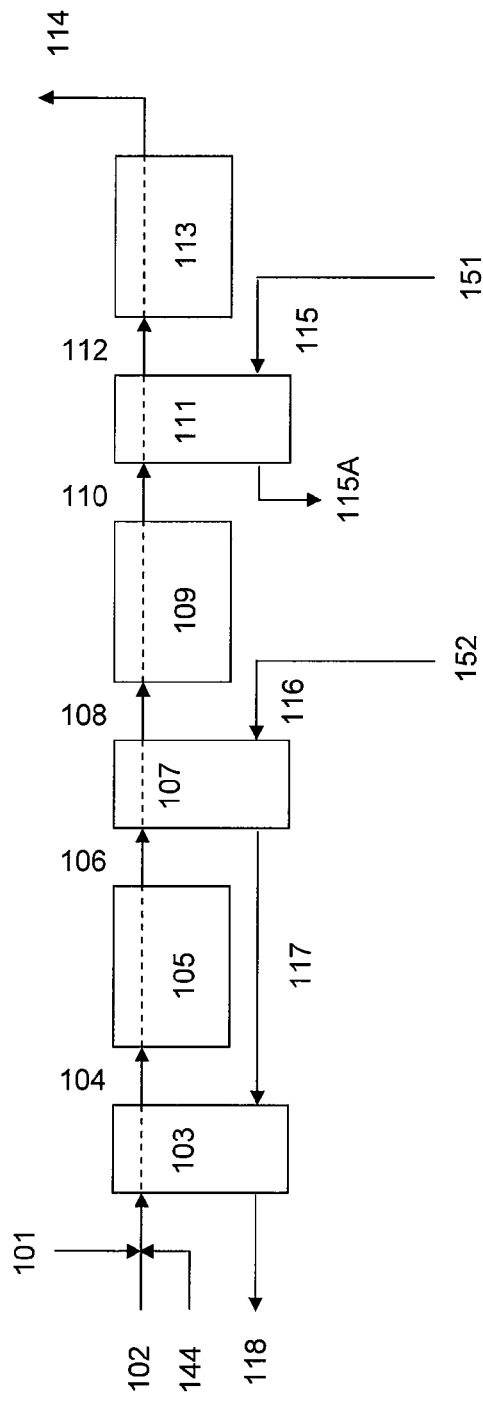
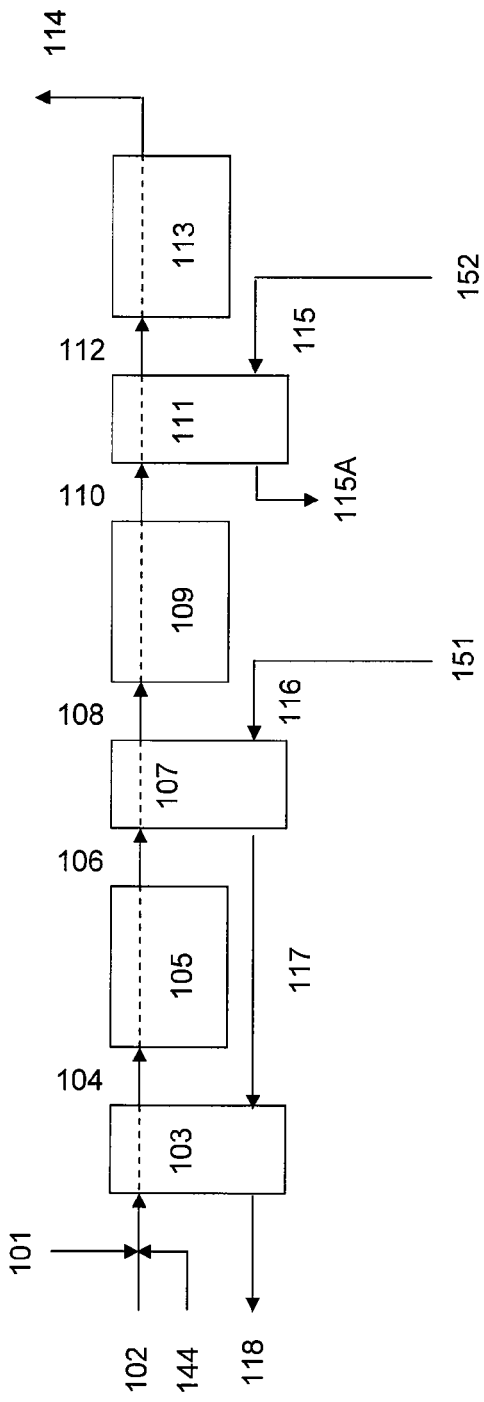
Figure 2E
Figure 2F

HYDROGEN PRODUCTION WITH REDUCED CARBON DIOXIDE GENERATION AND COMPLETE CAPTURE

FIELD OF THE INVENTION

This invention relates to a method of reducing the total carbon dioxide production and shift the balance of carbon dioxide from a reformer furnace flue gas to the high pressure syngas exit water gas shift reaction unit.

BACKGROUND

A process for making hydrogen with low to no CO2 production is disclosed in the present invention. It incorporates the concepts described in co-pending US patent application 2010-0037521, herein incorporated by reference, describes a process for making hydrogen by adjusting the conditions in the steam methane reformer (SMR) to produce more hydrogen and CO by converting more methane and subsequently converting more of the CO to Hydrogen in a lower temperature medium temperature shift or the combination of high temperature and low temperature shift reactors. This CO2 in the syngas is then removed by contacting with an amine wash and the hydrogen is purified in a pressure swing adsorption (PSA) unit—with the residue (tail gas) of the PSA being sent to the SMR furnace to provide the necessary fuel for the furnace. Supplemental fuel is provided typically by natural gas to provide the additional fuel needed to control the temperature of the SMR furnace. This process removes about 67% of the CO2 produced in the Hydrogen plant compared to a conventional steam methane reformer equipped with an amine contactor in which about 57% of the CO2 can be removed. The remaining CO2 is produced from remaining CO and Methane in the PSA tail gas and the supplemental natural gas fuel are combusted in the SMR furnace to CO2 and contribute the remaining CO2 which is not recovered and emitted in the Furnace flue gas. Co-pending US patent application 2010-0037521 further teaches that the CO2 recovery can be further increased to about 90% by increasing the SMR feed by 33% and reducing the hydrogen recovery in the PSA such that enough more hydrogen is passed to the tail gas and subsequently to the SMR furnace and no supplemental natural gas is supplied to the SMR Furnace.

Co-pending, as-yet unpublished patent application Ser. No. 12/970,041, herein incorporated by reference, teaches that the extent of pre-reforming can be increased by utilizing higher amounts of waste heat for pre-reforming. The reaction products from a first stage of pre-reforming is heated to a higher temperature by exchanging heat with flue gas or process gas and sent to a second adiabatic catalytic reactor in which the endothermic reforming reactions drop the temperature. The process can be repeated through up to 4 or 5 pre-reformers in series and subsequently increasing the amount of pre-reforming from about 8-10% per a single bed pre-reformer to up to 20-25%. With higher degree of pre-reforming, the firing duty of the main reformer is reduced.

Referring to Co-pending US patent application 2010-0037521, the inventors teach that CO2 emissions from an SMR can be reduced by reducing the amount of CO2 produced by burning hydrocarbons in the SMR furnace. Co-pending, as-yet unpublished patent application Ser. No. 12/970,041 teaches that by increasing the extent of pre-reforming utilizing waste heat as the heat source, that the firing duty of the main reformer is reduced. For example by using three stages of pre-reforming instead of one stage of pre-reforming, the CO2 emissions from a conventional SMR can be reduced by 5-6%. By utilizing the increased pre-reforming concepts disclosed in Ser. No. 12/970,041 in addition to the increased CO2 capture taught in invention 2010-0037521, the CO2 removed can be increased from about 67% to about 90% without lowering the PSA H2 recovery as taught in 2010-0037521. Another benefit of the invention is that by using waste heat from the SMR furnace to do additional pre-reforming, steam production is reduced and when combined with CO2 removal by an amine contactor, there is no net export of steam from the SMR.

CO2 recovery utilizing the present invention can be further increased to 100%. This is achieved by taking the flue gas from SMR furnace through a dryer to remove water and compressing it. Typical specification for Nitrogen used for Enhanced Oil Recovery is >95% nitrogen. The resulting flue gas from the present invention will contain >95% Nitrogen+Argon, <3.1% CO2 and less than 1.9% Oxygen and would be an excellent gas to be used for enhanced oil recovery. By utilizing the flue gas for Enhanced Oil Recovery, no flue gas is emitted from the SMR and therefore no CO2 or NOx emissions.

A preferred gas for enhanced oil recovery would contain very low oxygen content. To produce a flue gas with low oxygen content, the flue gas from the SMR is combined with purified hydrogen from the PSA and contacted over a bed of catalyst to promote combustion of H2 with O2 to form water. The resulting flue gas stream is dried to remove excess water and compressed and used for enhanced oil recovery. The composition of the flue gas stream would be >97% N2+Argon, <3% CO2 and <0.1% O2, <0.1% H2.

The production of hydrogen by the steam reforming of hydrocarbons is well known. In the basic process, a hydrocarbon, or a mixture of hydrocarbons, is initially treated to remove, or convert and then remove, trace contaminants, such as sulfur and olefins, which would adversely affect the reformer and the down stream water gas shift unit catalyst. Natural gas containing predominantly methane is a preferred starting material since it has a higher proportion of hydrogen than other hydrocarbons. However, light hydrocarbons or refinery off gases containing hydrocarbons, or refinery streams such as LPG, naphtha hydrocarbons or others readily available light feeds might be utilized as well.

The pretreated hydrocarbon feed stream is typically at a pressure of about 200 to 400 psig, and combined with high pressure steam, which is at a higher than the feed stream pressure, before entering the reformer furnace. The amount of steam added is much in excess of the stoichiometric amount. The reformer itself conventionally contains tubes packed with catalyst through which the steam/hydrocarbon mixture passes. An elevated temperature, e.g. about 1580° F., or 860° C., is maintained to drive the endothermic reaction.

Prereforming of hydrocarbons upstream of the SMR or ATR is a well known process. It converts heavier hydrocarbons (ethane and heavier) to methane. It may also convert some of the methane to hydrogen, CO, and CO2, depending upon the chemical equilibrium under the given conditions.

Prereformer utilizes waste heat in the flue gas or process stream, which otherwise may be utilized in raising steam. Utilization of high level heat (at about 1600° F. to about 900° F.) is thermodynamically more efficient when used for prereforming than for raising steam with boiling temperature of about 400° F. to 600° F. Disposal of excess steam is a problem in many plants.

Typically the feed (hydrocarbon and steam mixture) to the prereformer is preheated in the range of 850° F. to 1000° F. before contacting with a catalytic bed in an adiabatic reactor. The reactants come to a chemical equilibrium. The extent of conversion of methane to H2/CO/CO2 is a function of the reaction temperature, higher temperature favoring the conversion.

The inlet temperature of the feed to prereformer is limited by its potential to crack hydrocarbons and deposit carbon on the catalyst and the preheat coils. Heavier the feedstock, lower is the potential cracking temperature. For example, the feed temperature for typical light natural gas is limited to about 1000° F., while feed temperature for naphtha feed is limited to 850° F. The amount of waste-heat utilization for prereforming depends on the preheat temperature of feed mixture. There is a need for a process that can utilize larger amounts of waste heat for prereforming.

The effluent from the reformer furnace is principally hydrogen, carbon monoxide, carbon dioxide, water vapor, and methane in proportion close to equilibrium amounts at the furnace temperature and pressure. The effluent is conventionally introduced into a one- or two-stage water gas shift reactor to form additional hydrogen and carbon dioxide. The shift reactor converts the carbon monoxide to carbon dioxide by reaction with water vapor, which generates additional Hydrogen. This reaction is endothermic. The combination of steam reformer and water gas shift converter is well known to those of ordinary skill in the art.

If CO2 capture from the high pressure syngas stream exiting the water gas shift unit is desired, the shift converter effluent, which comprises hydrogen, carbon dioxide and water with minor quantities of methane and carbon monoxide is introduced into a conventional absorption unit for carbon dioxide removal. Such a unit operates on the well-known amine wash or other solvent processes wherein carbon dioxide is removed from the effluent by dissolution in an absorbent solution, i.e. an amine solution or potassium carbonate solution, respectively. Conventionally, such units can remove up to 99 percent or higher of the carbon dioxide in the shift converter effluent.

The effluent from the carbon dioxide absorption unit is introduced into a pressure swing adsorption (PSA) unit. PSA is a well-known process for separating essentially pure hydrogen from the mixture of gases as a result of the difference in the degree of adsorption among them on a particulate adsorbent retained in a stationary bed.

Conventionally, the remainder of the PSA unit feed components, after recovery of pure hydrogen product, which comprises carbon monoxide, the hydrocarbon, i.e. methane, hydrogen and carbon dioxide, is returned to the steam reformer furnace and combusted to obtain energy for use therein To practice CO2 emissions capture from such hydrogen plants, one must consider total emissions resulting from the plant, which includes CO2 recovery from reformer furnace flue gas as well.

SUMMARY

The present invention is a method of reducing the carbon dioxide balance from a reformer furnace flue gas to the high pressure syngas exit water gas shift reaction unit, comprising; providing a first gas mixture; heating said first stream mixture to a first temperature, then introducing said heated first gas mixture into at least one pre-reforming chamber, thereby producing a pre-reformed mixture; said heating being provided by indirect heat exchange with one or more of an SMR furnace flue gas or an SMR furnace syngas further heating said pre-reformed mixture in a primary reformer, thereby generating a second gas mixture comprising hydrogen, carbon monoxide, carbon dioxide, and a flue gas, wherein said primary reformer comprises tubes filled with catalyst; introducing said second gas mixture into at least one isothermal shift reactor, or a combination of high followed by a low temperature shift reactor, or a medium temperature shift reactor, thereby generating a third gas mixture; introducing said third gas mixture into a standard H2 PSA unit, wherein said third gas mixture is separated into a hydrogen enriched stream and a PSA tail gas stream; introducing said PSA tail gas stream into a CPU system, wherein said PSA tail gas stream is separated into a carbon dioxide enriched stream, a hydrogen rich stream, and a residual stream, and introducing said residual stream as fuel into the reformer furnace along with natural gas, a portion of the feed hydrocarbon stream, a portion of the hydrogen enriched stream, or any other external make-up fuel for the reformer furnace, wherein step b) is repeated twice, for a total of three pre-reforming steps, the temperature at the second pre-reformer is higher than at the first pre-reformer, and the temperature at the third pre-reformer is higher than at the second, where the pre-reforming chamber comprises at least three beds of catalyst, wherein an outlet gas from each pre-reformer is heated up in a coil in exchange with the SMR furnace flue gas or process syngas before going to a next pre-reformer reactor, and an outlet gas from the third pre-reformer or before entering the main reformer tubes.

BRIEF DESCRIPTION OF DRAWINGS

The invention may be understood by reference to the following description taken in conjunction with the accompanying drawings, and in which:

FIGS. 2A-2F illustrate various permutations in accordance with various embodiments of the present invention.

DESCRIPTION OF PREFERRED EMBODIMENTS

Figure 1:
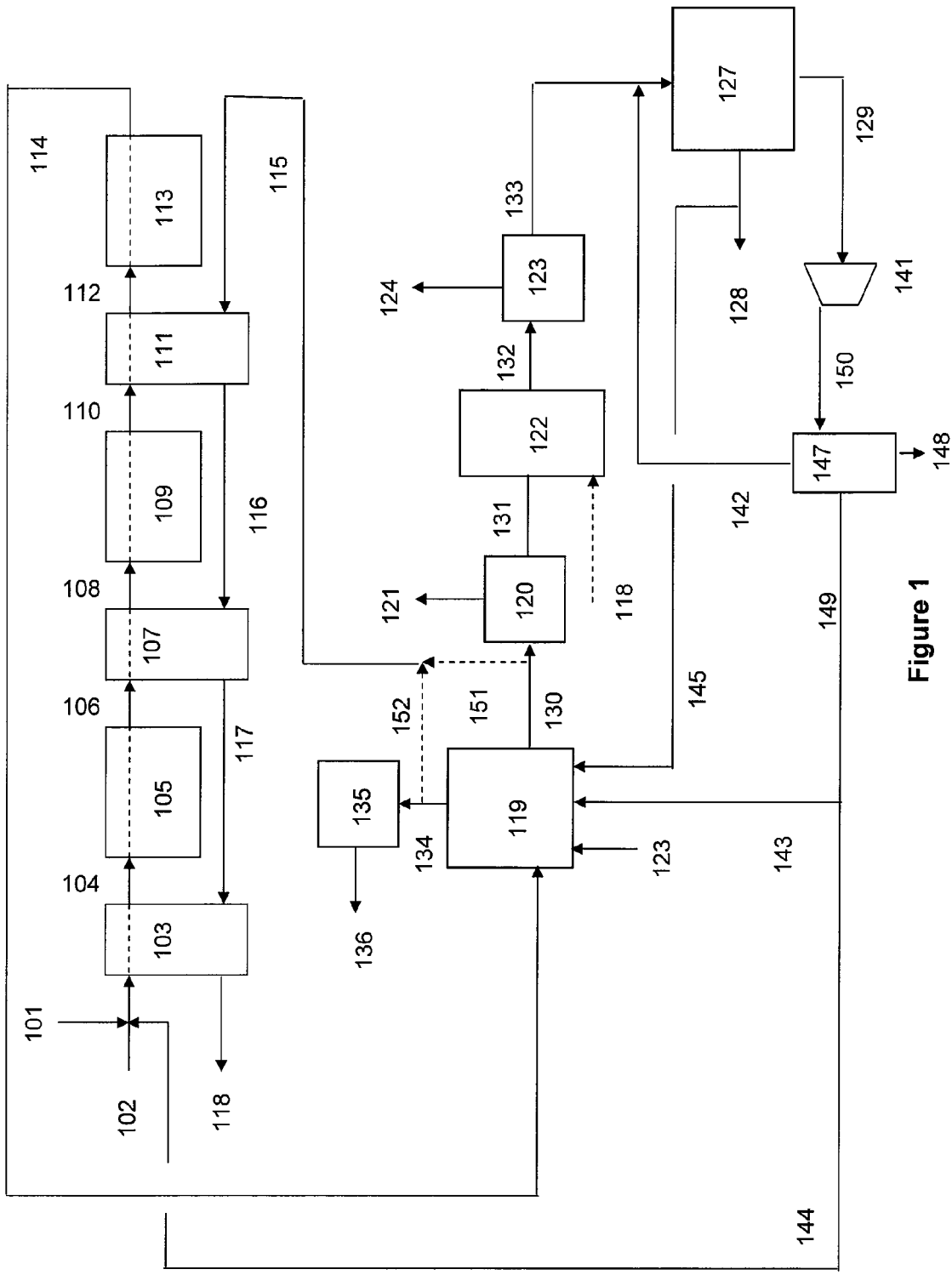
FIG. 1 illustrates the use of a CPU in accordance with one embodiment of the present invention.
Figure 2C:
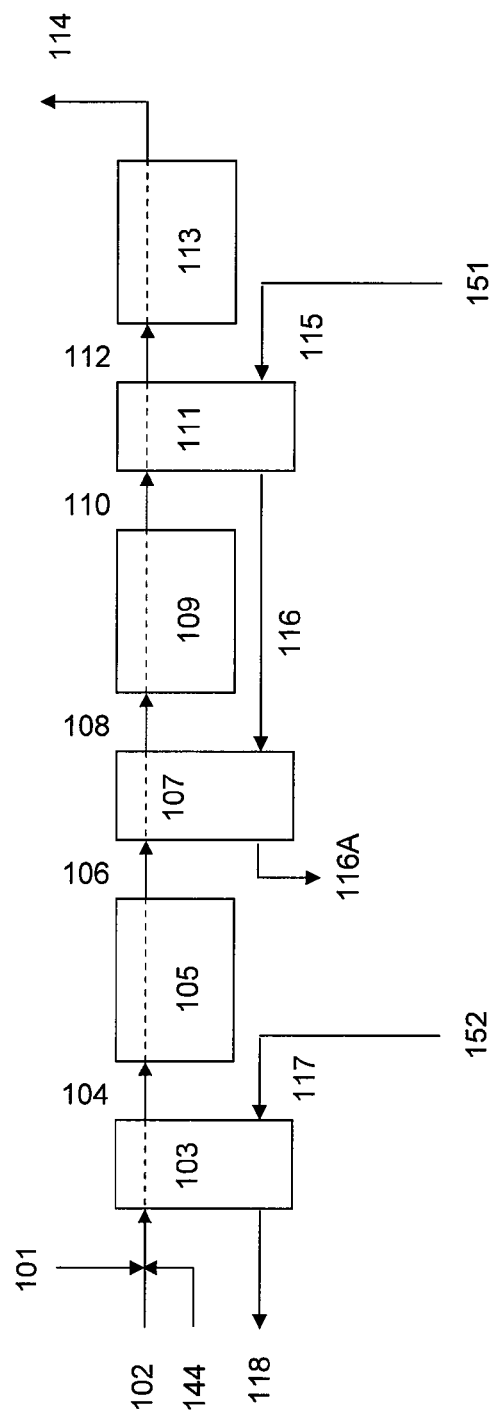
Figure 2D:
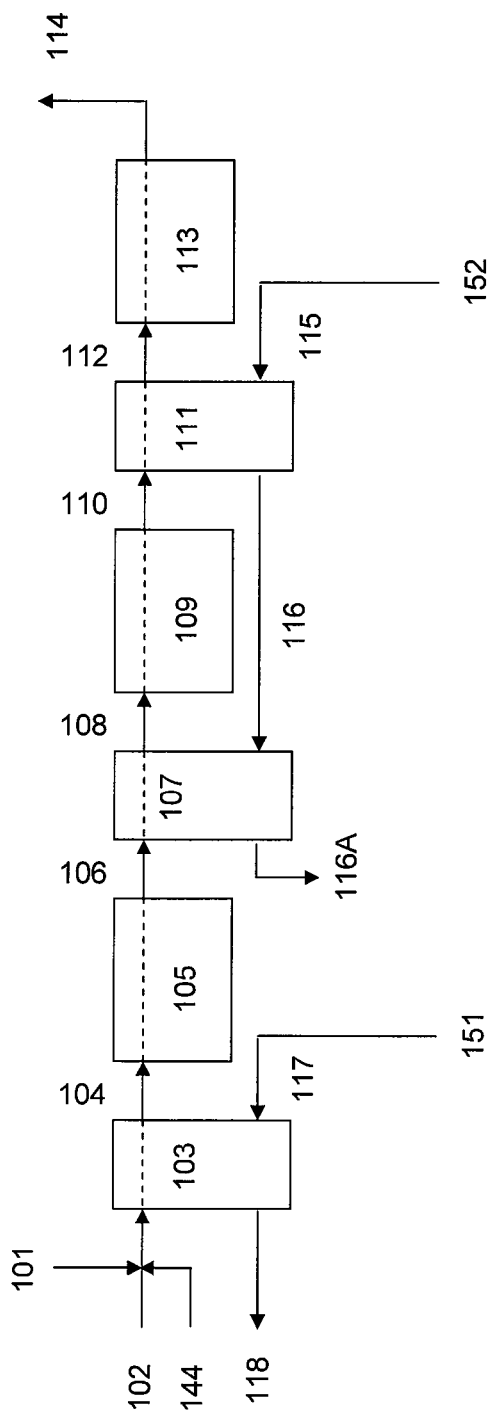

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning to FIG. 1, which illustrates one embodiment of the present invention, a first stream comprising hydrocarbons 101, steam 102, and possibly PSA offgas stream 144 is heated to a first temperature in first heat exchanger 103, by indirect heat exchange with hot gas stream 117, thereby producing first pre-reformer inlet stream 104. First pre-reformer inlet stream 104 is then introduced into first pre-reforming chamber 105, thereby producing first pre-reformed stream 106.

First pre-reformed stream 106 is heated to a second temperature in second heat exchanger 107, by indirect heat exchange with hot gas stream 116, thereby producing second pre-reformer inlet stream 108. Second pre-reformer inlet stream 108 is then introduced into second pre-reforming chamber 109, thereby producing second pre-reformed stream 110.

Second pre-reformed stream 110 is heated to a third temperature in third heat exchanger 111, by indirect heat exchange with hot gas stream 115, thereby producing third pre-reformer inlet stream 112. Third pre-reformer inlet stream 112 is then introduced into third pre-reforming chamber 113, thereby producing third pre-reformed stream 114. Third pre-reformed stream 114 may then be heated once again in a fourth heat exchanger (not shown) prior to usage downstream. Note in one embodiment, hot gas stream 117, hot gas stream 116, and hot gas stream 115 may come from different sources (not shown).

The second temperature may be greater than said first temperature. The third temperature may be greater than said second temperature. The indirect heat exchange may be with a flue gas from an SMR furnace. The indirect heat exchanger may be with one or more process streams. The indirect heat exchange may be with SMR furnace syngas.

The amount of steam mixed with hydrocarbons depends on the catalyst, and the type of hydrocarbon feedstock. The skilled artisan will be able to select the proper amount of steam for any application without undue experimentation.

Each pre-reforming chamber may be a stand alone reactor. At least two pre-reforming chambers may be contained in a single vessel. All three pre-reforming chambers may be contained in a single vessel. The three pre-reforming beds may be stacked in one vessel with internal heads. The first pre-reforming chamber may have a first space velocity, the second pre-reforming chamber may have a second space velocity, and the third pre-reforming chamber may have a third space velocity, where the first space velocity is lower than said second space velocity or said third space velocity.

The pre-reformer chambers may consist of a bank of tubes filled with catalyst which are heated in contact with SMR furnace flue gas or syngas.

Third pre-reformed stream 114 is introduced to a novel primary reformer 119, wherein a syngas stream 130 comprising at least carbon dioxide and hydrogen is produced. Novel primary reformer 119 may be configured and operated as defined in co-pending US patent application 2010-0037521, herein incorporated by reference. Either at least a portion 152 of the reformer furnace flue gas stream 134 or a portion 151 of the syngas stream 130 may be directed to the pre-reformer, as hot gas stream 115.

A portion of the syngas stream 130 may be sent to a waste heat recovery unit 120 to produce steam 121. The exit of waste heat recovery, stream 131 is then introduced to a high temperature shift reactor followed by a low temperature shift reactor, or alternatively either an isothermal or a medium temperature shift reactor (symbolically represented by 122). This produces a carbon dioxide richer stream 132. Carbon dioxide richer stream 132 is further cooled in waste heat recovery unit 123 to generate steam 124, and a cooler syngas stream 133.

The cooler syngas stream 133 is introduced into the PSA unit 127 wherein relatively pure hydrogen 128 is recovered, and residual stream 129 may be compressed in compressor 141 to produce compressed stream 150, and introduced into a CO2 separation unit 147 (such as a CPU, i.e. cryogenic purification unit). CO2 separation unit 147 may be a CPU or a combination of CPU and membrane units. In the CO2 separation unit 147, stream 150 is separated into a CO2 stream 148 and a hydrogen rich stream 142 which may be recycled to PSA 127 and a residual stream 149. A portion 144 of residual stream 149 may be recycled upstream of reformer 119. At least a portion 143 of residual stream may be used as fuel in steam reformer 119.

A portion of reformer furnace flue gas stream 134 may be sent to waste heat recovery unit 135, to produce steam 136 or preheat other process streams (not shown). The total carbon dioxide recovered by the amine wash may represent greater than 80% of the overall carbon dioxide generated by the SMR, preferably 90%. The total carbon dioxide recovered by the amine wash may represent greater than 85% of the overall carbon dioxide generated by the SMR, preferably 95%.

In one embodiment of the present invention, the catalyst in the first pre-reformer consists of conventional pre-reforming catalyst, and the catalyst in following pre-reformers of typical main catalyst bed reforming catalyst.

A portion of the heat for the reforming reaction may be provided by exchange with exit gas through the helical shaped tubes. The temperature of the exit gas from the top of the helical tubes may be between 1200 and 1300 degrees F.

As illustrated in FIGS. 2A-2F, the various pre-reformers may be provided heat by either a portion 152 of the reformer furnace flue gas stream 134, or a portion 151 of the syngas stream 130, in any appropriate combination, but portion 151 and portion 152 will typically be at different pressure and of different composition, so physically blending these two portions will ordinarily not occur.

The flue gas from the SMR furnace may be utilized for industrial purposes resulting in 100% recovery of the CO2 and no emission of nitrogen oxides from the SMR. The SMR furnace flue gas may be compressed and used for "Enhanced Oil Recovery (EOR)." The SMR Furnace Flue gas may be dried to remove water by passing through a bed of adsorbent. The Nitrogen+Argon composition of the flue gas downstream of the drier may be greater than or equal to 95%. The SMR flue gas may be contacted with Hydrogen from the PSA and passed over a bed of catalyst to promote combustion of H2 with O2. The oxygen content of the flue gas downstream of the combustion zone may be less than 0.1 mol %. The SMR Furnace Flue gas may be dried to remove water by passing through a bed of adsorbent. The Nitrogen+Argon composition of the flue gas downstream of the drier may be greater than or equal to 97%, preferentially 99%.

Illustrative embodiments have been described above. While the method in the present application is susceptible to various modifications and alternative forms, specific embodiments thereof have been shown by way of example in the drawings, and have been herein described in detail. It should be understood, however, that the description herein of specific embodiments is not intended to limit the method in the present application to the particular forms disclosed, but on the contrary, the method in the present application is to cover all modifications, equivalents, and alternatives falling within the spirit and scope of the method in the present application, as defined by the appended claims.

It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but, would nevertheless, be a routine undertaking for those of ordinary skill in the art, having the benefit of this disclosure.

What is claimed is:

1. A method of reducing the carbon dioxide balance from a reformer furnace flue gas to a high pressure syngas exit water gas shift reaction unit, the method comprising the steps of:
   a) providing a first gas mixture;
   b) heating said first stream mixture to a first temperature, then introducing said heated first gas mixture into a pre-reforming chamber to produce pre-reformed mixture;
   c) further heating said pre-reformed mixture in a primary reformer, thereby generating a second gas mixture comprising hydrogen, carbon monoxide, carbon dioxide, and a flue gas, wherein said primary reformer comprises a reformer furnace and tubes filled with catalyst, wherein the second gas mixture and/or the flue gas provides said heating for step b);
   d) introducing said second gas mixture into at least one isothermal shift reactor, or a combination of high followed by a low temperature shift reactor, or a medium temperature shift reactor, thereby generating a third gas mixture;
   e) introducing said third gas mixture into a PSA unit, wherein said third gas mixture is separated into a hydrogen enriched stream and a PSA tail gas stream;
   f) introducing said PSA tail gas stream into a CPU system, wherein said PSA tail gas stream is separated into a carbon dioxide enriched stream, a hydrogen rich stream, and a residual stream; and
   g) introducing said residual stream as fuel into the reformer furnace along with natural gas, a portion of the feed hydrocarbon stream, a portion of the hydrogen enriched stream, or any other external make-up fuel for the reformer furnace,
   wherein step b) is repeated twice in a second pre-reforming chamber and a third pre-reforming chamber, for a total of three pre-reforming steps, such that the resulting temperature of the pre-reformed mixture is higher after each repetition,
   wherein each pre-reforming chamber comprises a bed of catalyst, wherein an outlet gas from each pre-reformer is heated up in a coil in exchange with the second gas mixture and/or the flue gas before going to the next pre-reforming chamber,
   wherein the flue gas is utilized for industrial purposes resulting in 100% recovery of the CO2 and no emission of nitrogen oxides from the primary reformer,
   wherein the flue gas is contacted with hydrogen from the PSA unit and passed over a bed of catalyst to promote combustion.

2. The method of claim 1, wherein said CPU comprises a compression purification unit, or a combination of CPU and membrane units.

3. The method of claim 1, wherein the three beds of catalyst are stacked in one vessel with internal heads.

4. The method of claim 1, wherein the carbon dioxide enriched stream represents greater than 80% of the overall CO2 generated in the primary reformer.

5. The method of claim 4, wherein the carbon dioxide enriched stream represents greater than 90% of the overall CO2 generated in the primary reformer.

6. The method of claim 1, wherein there is no steam exported from the primary reformer.

7. The method of claim 1, wherein a portion of the hydrogen rich stream is recycled to the PSA unit.

8. The method of claim 1, wherein a portion of the residual stream is recycled upstream of the first pre-reforming chamber.

9. The method of claim 1, wherein a portion of the hydrogen rich stream is recycled to the PSA unit and a portion of the residual stream is recycled upstream of the first pre-reforming chamber.

10. The method of claim 1, wherein the SMR furnace flue gas is compressed and used for Enhanced Oil Recovery.

11. The method of claim 10, wherein the SMR Furnace Flue gas is dried to remove water by passing through a bed of adsorbent.

12. The method of claim 11, wherein the Nitrogen+Argon composition of the flue gas downstream of the drier is greater than or equal to 95%.

13. The method of claim 1, wherein the oxygen content of the flue gas downstream of the primary reformer is less than 0.1 mol %.

14. The method of claim 13, further comprising the step of passing the flue gas through a drier comprising a bed of adsorbent to remove water from the flue gas.

15. The method of claim 14, wherein the Nitrogen+Argon composition of the flue gas downstream of the drier is greater than or equal to 99%.

16. A method of reducing the carbon dioxide balance from a reformer furnace flue gas to a high pressure syngas exit water gas shift reaction unit, the method comprising the steps of:
   a) providing a first gas mixture;
   b) heating said first stream mixture to a first temperature, then introducing said heated first gas mixture into a pre-reforming chamber to produce, a pre-reformed mixture;
   c) further heating said pre-reformed mixture in a primary reformer, thereby generating a second gas mixture comprising hydrogen, carbon monoxide, carbon dioxide, and a flue gas, wherein said primary reformer comprises a reformer furnace and tubes filled with catalyst, wherein the second gas mixture and/or the flue gas provides said heating for step b);
   d) introducing said second gas mixture into at least one isothermal shift reactor, or a combination of high followed by a low temperature shift reactor, or a medium temperature shift reactor, thereby generating a third gas mixture;
   e) introducing said third gas mixture into a PSA unit, wherein said third gas mixture is separated into a hydrogen enriched stream and a PSA tail gas stream;
   f) introducing said PSA tail gas stream into a CPU system, wherein said PSA tail gas stream is separated into a carbon dioxide enriched stream, a hydrogen rich stream, and a residual stream; and
   g) introducing said residual stream as fuel into the reformer furnace along with natural gas, a portion of the feed hydrocarbon stream, a portion of the hydrogen enriched stream, or any other external make-up fuel for the reformer furnace,
   wherein step b) is repeated twice in a second pre-reforming chamber and a third pre-reforming chamber, for a total of three pre-reforming steps, such that the resulting temperature of the pre-reformed mixture is higher after each repetition,
   wherein each pre-reforming chamber comprises a bed of catalyst, wherein an outlet gas from each pre-reformer is heated up in a coil in exchange with the second gas mixture and/or the flue gas before going to the next pre-reforming chamber,
   wherein each pre-reforming chamber includes a bank of tubes filled with catalyst that are configured to be heated in counter-current contact with the flue gas, wherein the carbon dioxide enriched stream represents greater than 85% of the overall CO2 generated in the primary reformer, wherein the catalyst at the top of the tube include conventional pre-reforming catalyst and at the bottom of tube include typical main catalyst bed reforming catalyst, wherein the transition between pre-reforming catalyst and main reforming catalyst is done through a series of progressively larger catalyst pellets.

17. The method of claim 16, wherein the flue gas is utilized for industrial purposes resulting in 100% recovery of the CO2 and no emission of nitrogen oxides from the primary reformer.

18. The method of claim 17, wherein the flue gas is compressed and used for Enhanced Oil Recovery.

19. The method of claim 18, further comprising the step of passing the flue gas through a drier comprising a bed of adsorbent to remove water from the flue gas.

20. The method of claim 19, wherein the Nitrogen+Argon composition of the flue gas downstream of the drier is greater than or equal to 95%.

21. The method of claim 1, wherein the oxygen content of the flue gas downstream of the combustion zone is less than 0.1 mol %.

22. The method of claim 21, further comprising the step of passing the flue gas through a drier comprising a bed of adsorbent to remove water from the flue gas.

23. The method of claim 22, wherein the Nitrogen+Argon composition of the flue gas downstream of the drier is greater than or equal to 99%.

24. The method of claim 16, wherein the carbon dioxide enriched stream represents greater than 95% of the overall CO2 generated in the primary reformer.

25. The method of claim 16, wherein no steam is exported from the primary reformer.

26. The method of claim 16, wherein a portion of the hydrogen rich stream is compressed and recycled to the PSA unit.

27. The method of claim 16, wherein a portion of the residual stream is compressed and recycled upstream of the first pre-reforming chamber.

28. The method of claim 16, wherein a portion of the hydrogen rich stream is recycled to the PSA unit and a portion of the residual stream is recycled upstream of the first pre-reforming chamber.

29. The method of claim 16, wherein each zone of catalyst is at least 3 inches deep.

30. The method of claim 16, wherein the process gas from the exit of the pre-reforming tube is passed through two helical shaped tubes back up the pre-reformer tube.

31. The method of claim 30, wherein a portion of the heat for the reforming reaction in said tubes is provided by exchange with the exit gas through the helical shaped tubes.

32. The method of claim 31, wherein the temperature of the exit gas from the top of the helical tubes is between 500 and 1300 Degrees F.

33. The method of claim 31, wherein the temperature of the exit gas from the top of the helical tubes is between 1200 and 1300 Degrees F.

34. A method of reducing the carbon dioxide balance from a reformer furnace flue gas to a high pressure syngas exit water gas shift reaction unit, the method comprising the steps of:
a) providing a first gas mixture;
b) heating said first stream mixture to a first temperature, then introducing said heated first gas mixture into a pre-reforming chamber to produce, a pre-reformed mixture;
c) further heating said pre-reformed mixture in a primary reformer, thereby generating a second gas mixture comprising hydrogen, carbon monoxide, carbon dioxide, and a flue gas, wherein said primary reformer comprises a reformer furnace and tubes filled with catalyst, wherein the second gas mixture and/or the flue gas provides said heating for step b);
d) introducing said second gas mixture into at least one isothermal shift reactor, or a combination of high followed by a low temperature shift reactor, or a medium temperature shift reactor, thereby generating a third gas mixture;
e) introducing said third gas mixture into a PSA unit, wherein said third gas mixture is separated into a hydrogen enriched stream and a PSA tail gas stream;
f) introducing said PSA tail gas stream into a CPU system, wherein said PSA tail gas stream is separated into a carbon dioxide enriched stream, a hydrogen rich stream, and a residual stream; and
g) introducing said residual stream as fuel into the reformer furnace along with natural gas, a portion of the feed hydrocarbon stream, a portion of the hydrogen enriched stream, or any other external make-up fuel for the reformer furnace, wherein step b) is repeated twice in a second pre-reforming chamber and a third pre-reforming chamber, for a total of three pre-reforming steps, such that the resulting temperature of the pre-reformed mixture is higher after each repetition, wherein each pre-reforming chamber comprises a bed of catalyst, wherein an outlet gas from each pre-reformer is heated up in a coil in exchange with the second gas mixture and/or the flue gas before going to the next pre-reforming chamber, wherein a process gas from the exit of a reforming tube is passed through two helical shaped tubes back up a pre-reformer tube, wherein the flue gas from the primary reformer is utilized for industrial purposes resulting in 100% recovery of the CO2 and no emission of nitrogen oxides from the primary reformer, wherein the flue gas is contacted with hydrogen from the PSA and passed over a bed of catalyst to promote combustion.

35. The method of claim 34, wherein a portion of the heat for the reforming reaction in said tubes is provided by exchange with the exit gas through the helical shaped tubes.

36. The method of claim 34, wherein flue gas is compressed and used for Enhanced Oil Recovery.

37. The method of claim 36, further comprising the step of passing the flue gas through a drier comprising a bed of adsorbent to remove water from the flue gas.

38. The method of claim 37, wherein the Nitrogen+Argon composition of the flue gas downstream of the drier is greater than or equal to 95%.

39. The method of claim 34, wherein the oxygen content of the flue gas downstream of the combustion zone is less than 0.1 mol %.

40. The method of claim 39, further comprising the step of passing the flue gas through a drier comprising a bed of adsorbent to remove water from the flue gas.

41. The method of claim 40, wherein the Nitrogen+Argon composition of the flue gas downstream of the drier is greater than or equal to 97%.

42. The method of claim 34, wherein the carbon dioxide enriched stream represents greater than 80% of the overall CO2 generated in the primary reformer.

43. The method of claim 42, wherein the carbon dioxide enriched stream represents greater than 90% of the overall CO2 generated in the primary reformer.

44. The method of claim 34, wherein there is no steam exported from the primary reformer.

45. The method of claim 34, wherein a portion of the hydrogen rich stream is recycled to the PSA unit.

46. The method of claim 34, wherein a portion of the residual stream is recycled upstream of the first pre-reforming chamber.

47. The method of claim 34, wherein a portion of the hydrogen rich stream is recycled to the PSA unit and a portion of the residual stream is recycled upstream of the first pre-reforming chamber.

* * * * *